US005683327A

United States Patent [19]

Inuzuka et al.

[11] Patent Number: 5,683,327
[45] Date of Patent: Nov. 4, 1997

[54] FIRST AND SECOND HYSTERESIS ZONES FOR SHIFT AND LOCK-UP CONTROL SYSTEM IN AN AUTOMATIC TRANSMISSION

[75] Inventors: Takeshi Inuzuka; Masashi Hattori, both of Anjo; Yoshito Takeshita, Fukui, all of Japan

[73] Assignee: Aisin AW Co., Ltd., Japan

[21] Appl. No.: 563,385

[22] Filed: Nov. 28, 1995

[30] Foreign Application Priority Data

Nov. 29, 1994 [JP] Japan .................................. 6-317757

[51] Int. Cl.$^6$ .................................................. F16H 61/14
[52] U.S. Cl. ............................. 477/62; 477/63; 477/174
[58] Field of Search ............................ 477/61, 62, 63, 477/64, 168, 169, 174, 175

[56] References Cited

U.S. PATENT DOCUMENTS

| | | | |
|---|---|---|---|
| 4,495,576 | 1/1985 | Ito | 477/63 X |
| 4,618,041 | 10/1986 | Sotoyama et al. | 477/62 |
| 4,811,827 | 3/1989 | Ishikawa et al. | 477/63 |
| 5,167,169 | 12/1992 | Saito et al. | 477/62 |
| 5,505,670 | 4/1996 | Inuzuka et al. | 477/63 X |

FOREIGN PATENT DOCUMENTS

| | | |
|---|---|---|
| 61-157855 | 12/1984 | Japan . |
| 5635858 | 8/1991 | Japan . |

*Primary Examiner*—Khoi Q. Ta
*Attorney, Agent, or Firm*—Lorusso & Loud

[57] ABSTRACT

A control system for an automatic transmission including a fluid transmission unit and a lockup clutch arranged in the fluid transmission unit. A running state sensor(s) detects the running state of the vehicle and outputs signals to an electronic control unit for deciding a shift and outputting a shift signal and for deciding lockup clutch ON/OFF and outputting a lockup ON/OFF signal. A hydraulic control unit selectively actuates a plurality of solenoid valves, in response to the output signals from the electronic control unit, to selectively apply/release a plurality of frictional engagement elements, to establish a new gear stage, and the lockup clutch. The electronic control unit (ECU) has stored in memory therein, a lockup diagram having a first hysteresis region defined by a lockup OFF line and a first lockup ON line, and a second hysteresis region defined by a second lockup ON line formed in the first hysteresis region and the first lockup ON line. The ECU compares the output signals of the running state sensor(s) against the lockup diagram to decide lockup clutch OFF, if the running state is in a region below the lockup OFF line, lockup clutch ON, if the running state is over the first lockup ON line, and lockup clutch ON if the running state is in the second hysteresis region. The ECU also outputs a lockup signal to a predetermined one of the solenoid valves to apply/release the lockup clutch in accordance with the results of the comparison.

5 Claims, 10 Drawing Sheets

| POSITION | | | SOLENOID | | | CLUTCH | | | BRAKE | | | |
|---|---|---|---|---|---|---|---|---|---|---|---|---|
| | | | S1 | S2 | S3 | C1 | C2 | C0 | B1 | B2 | B3 | B0 |
| D | AUTO. | 1ST | O | X | X | O | X | O | X | X | X | X |
| | | 2ND | O | O | X | O | X | O | X | O | X | X |
| | | 3RD | X |   | X | O | O | O | X | O | X | X |
| | | 4TH | X | X | X | O | O | O | X | O | X | O |
| | MANU. | 1ST | O | X | O | O | X | O | X | X | O | X |
| | | 2ND | O | O | O | O | X | O | O | O | X | X |
| S | | 1ST | O | X | X | O | X | O | X | X | X | X |
| | | 2ND | O | O | O | O | X | O | O | O | X | X |
| | | 3RD | X | O | X | O | O | O | X | O | X | X |
| | | (3RD) | X | X | X | O | O | O | X | O | X | X |
| L | | 1ST | O | X | O | O | X | O | X | X | O | X |
| | | 2ND | O | O | O | O | X | O | O | O | X | X |
| | | (1ST) | X | X | X | O | X | O | X | X | O | X |
| REMARKS | | | O | | | APPLY | | | | | | |
| | | | X | | | RELEASE | | | | | | |

FIRST AND SECOND HYSTERESIS ZONES FOR SHIFT AND LOCK-UP CONTROL SYSTEM IN AN AUTOMATIC TRANSMISSION

BACKGROUND OF THE INVENTION

1. Field of the Invention

The present invention relates to an automatic transmission and, more particularly, to lockup control of a fluid transmission unit by the electronic control unit of the automatic transmission.

2. Related Art

Prior Art automatic transmissions with a lockup clutch in a fluid transmission unit are typically operated under control of an electronic control unit having a lockup diagram (map) prestored in memory. Such a diagram has lockup ON and OFF regions corresponding to the vehicle speed and the throttle opening. Thus, the lockup is controlled ON/OFF by the electronic control unit, with reference to the ON/OFF regions in the lockup diagram, while actual vehicle speed and throttle opening information at each instant of vehicle operation are detected by sensors. Such an automatic transmission is exemplified by that disclosed in Japanese Patent Laid-Open No. 35858/1981.

A shifting unit has recently been developed which is additionally equipped with a manual shift mechanism capable of directly selecting any one of the gear stages of the automatic transmission. This shifting unit enables manual selection of the speed of the automatic transmission with the feeling of operation of a manual transmission and further allows for selection of either an automatic shift mode or a manual shift mode, as disclosed in Japanese Patent Laid-Open No. 157855/1986. This prior art shifting unit combines the linear pattern of an automatic shift unit with the H-shaped pattern of a manual shifting unit.

The prior art lockup control is effective for improving the fuel economy of the vehicle and in recent years the lockup region has been extended to the lower speed side on the lockup diagram so as to yet further improve fuel economy. In the above-described shifting unit disclosed in Japanese Laid-Open No. 157855/1986, it is particularly important, from the viewpoint of giving the feeling of operation of a manual transmission, to extend the lockup region on the lockup diagram to the lower speed side so as to increase the direct feeling of the vehicle speed change at the time of a manual shift.

However, merely extending the lockup region on the lockup diagram to the lower speed side (specifically, moving the lockup ON line of the diagram to the lower speed side) will cause the engagement of the lockup clutch while the vehicle is running at a lower speed with an increase in engaging shock, which might be unexpected and erroneously interpreted as a gear shift. In order to prevent this problem, it is theoretically possible to provide a lockup diagram with an ON/OFF hysteresis region having a lockup ON line which is set at a relatively high speed position where there is no problem of shock generation and a lockup OFF line shifted to the lower speed side, so that the lockup ON signal is output at the same time as a shift signal if the vehicle speed and the throttle opening are within the ON/OFF hysteresis region at the time of output of the shift signal. When the shift and the lockup are simultaneously effected, the lockup shock is indistinguishable from the shift shock and, accordingly, the lockup region can be extended to the lower speed side without causing the driver to feel an unexpected shock even with a sudden lockup.

If, however, a lockup occurs in the hysteresis region close to the lockup OFF line, the fluid transmission unit has a high fluid slip (as exemplified by an extremely large throttle opening) at an upshift when the gear ratio range is large, especially at the low speed gear stage. As a result, the engine rotation may be so reduced by the abrupt load change that the combination of the lockup shock and the shifting shock would be excessively high. In order to avoid this, while it is theoretically possible to shift the lockup OFF line to the higher speed side, such an approach is impractical because the engaged lockup clutch would prematurely release upon deceleration, i.e., at a higher speed than necessary.

SUMMARY OF THE INVENTION

It is, therefore, an object of the present invention to extend the lockup region to the lower speed side within the shock allowing range, not by shifting the lockup OFF line to a higher speed range, but by providing a second lockup ON line in the lockup ON/OFF hysteresis region of the lockup diagram stored in the memory of the electronic control unit.

Another object of the present invention is to optimize the lockup timing for a shift.

Yet another object of the present invention is to improve the sensation of manual shifting in an automatic transmission having an optional manual shift mode.

A further object of the present invention is to prevent engine stalling upon abrupt deceleration by extending the lockup region to the lower speed side.

In order to achieve the above-specified objects, the present invention provides an automatic transmission including: a fluid transmission unit; a lockup clutch in the fluid transmission unit; running state detection means for detecting the running state of the vehicle and for outputting signals indicating the detected running state; and an electronic control unit for deciding upon a shift, for outputting a shift signal responsive to that decision based on to the output signals of the running state detection means, for deciding ON/OFF for the lockup clutch and for outputting a lockup ON/OFF signal based on this latter decision. A hydraulic control unit is provided for selectively actuating a plurality of solenoid valves, in response to the output signals of the electronic control unit, to selectively apply/release both a plurality of frictional engagement elements, to thereby establish a gear stage, and the lockup clutch.

The electronic control unit (ECU) includes a memory and, stored in that memory, a lockup diagram having a first hysteresis region defined by a lockup OFF line and a first lockup ON line, and a second hysteresis region defined by a second lockup ON line, within the first hysteresis region, and the first lockup ON line. The ECU further includes decision means for comparing the lockup diagram and the output signals from the running state detection means, for deciding lockup clutch OFF if the running state is below the lockup OFF line, for deciding lockup clutch ON if the running state, when a shift is initiated on the basis of said shift decision, is over the first lockup ON line, and for deciding lockup clutch ON if the running state is in the second hysteresis region. The ECU also includes lockup signal output means for outputting a signal to a predetermined one of the solenoid valves to apply/release the lockup clutch in accordance with the decision of the decision means.

The electronic control unit may further include engaging state decision means for deciding whether or not the lockup clutch is applied at the gear stage prior a shift effected on the basis of its decision. The decision means decides lockup clutch ON, if the running state at the time of the shift is in the second hysteresis region when it is decided by the engaging state decision means that the lockup clutch is not applied, and decides lockup clutch ON if the running state at the time of the shift is in the first hysteresis region when it is decided by the engaging state decision means that the lockup clutch is applied.

The electronic control unit may further include timing decision means for deciding whether or not the shift started on the basis of the shift decision has just ended, and the decision means decides ON for the lockup clutch in the first or second hysteresis region on the basis of the decision of the engaging state decision means if it is decided by the timing decision means that the shift has just ended.

The automatic transmission may further include shift operation means for selecting between an automatic shift mode and a manual shift mode. In this case, the lockup diagram will include both an automatic shift mode lockup diagram for use in the automatic shift mode and a manual shift mode lockup diagram for use in the manual shift mode. The manual shift mode lockup diagram has its first hysteresis region extended significantly more to the lower speed side than the automatic shift mode lockup diagram, and the decision means decides lockup clutch ON in the first and in the second hysteresis region on the basis of the decision of the engaging state decision means when a manual shift mode is selected.

In the embodiment including the engaging state decision means, the decision means decides whether or not a shift effected on the basis of the shift decision is an upshift and, if the shift is an upshift, decides lockup clutch ON in the first and in the second hysteresis region, on the basis of the decision of the engaging state decision means.

In the present invention, the detected running state is compared with the stored lockup diagram so that the same lockup control as that of the prior art is executed when there is no shift. Specifically, in the lockup clutch applied state lockup clutch OFF is decided when the detected running state is within the region below the lockup OFF line, and in the lockup clutch released state lockup clutch ON is decided when the detected running state is within the region over the first lockup ON line. When the shift is effected on the basis of the shift decision, ON for the lockup clutch in the released state is decided if the running state at that time is in the second hysteresis region which is formed within the first hysteresis region. As a result, the lockup engagement in the second hysteresis region, which extends to a lower speed than the conventional lockup region, is effected simultaneously with the shift to prevent a shock unexpected by the driver. The second hysteresis region is further defined by the second lockup ON line which is at a higher speed than the lockup OFF line.

As a result, the lockup clutch in the applied state can be prevented from being prematurely released, by setting the lockup OFF line as in the prior art, while preventing a lockup engaging shock exceeding the allowable range in the low speed range in the vicinity of the lockup OFF line wherein the change of the engine R.P.M. due to the lockup engagement is relative high.

In the preferred embodiments including a engaging state decision means it decides whether or not the lockup clutch is applied at the gear stage before the shift. The decision means then, at the time of a shift, decides lockup ON, if no prior engagement, when the detected running state is in the second hysteresis region and, if there is prior engagement, when the detected running state in the first hysteresis region.

As a result, the lockup region is extended to a predetermined extent when a serious shift shock may occur in the low speed range near the OFF line and is extended to the entire lockup ON/OFF hysteresis region when there is no possibility of serious shift shock. Thus, the lockup region can be extended to the lower speed side while suppressing the engaging shock to within an allowable range.

When the shift and the lockup are simultaneously effected at the lower speed side, the lockup engagement timing, if premature, produces a seriously high shock which approaches double if excessively delayed. Therefore, the timing decision means monitors the shifting situation so that the lockup clutch is applied simultaneously with the end of the shift. As a result, the lockup shock occurs just after the end of the shift shock so that a double shock is prevented while suppressing the degree of shock itself to within an acceptable range.

In order to achieve the feeling of a manual shift within an automatic transmission, it is desirable to extend the lockup region to a lower speed than the lockup region for an automatic shift. Accordingly, when the manual shift mode is selected, the lockup control and the hysteresis control of the lockup clutch are carried out by applying the lockup diagram which is specific for the manual shift mode and is extended further to the lower speed side, as compared to the lockup diagram for the automatic shift mode. Thanks to the hysteresis control of the lockup clutch according to this embodiment, the clutch can be applied over a very wide range so that a direct feeling like that of a shift in a manual transmission can be achieved without an unexpected shock.

When the lockup region is extended to the lower speed side by the aforementioned lockup control, the lockup continues at the lower vehicle speeds and, at an abrupt downshift for engine braking, the engine may stall because of overload. However, this possibility of engine stalling can be eliminated by deciding the type of shift by the decision means and effecting the aforementioned lockup control only for an upshift. Moreover, since the engine R.P.M. drops at the time of lockup engagement, the driver may become alarmed by the behavior of the vehicle, if he downshifts expecting a rise of the engine R.P.M. which does not materialize due to lockup engagement. By performing the aforementioned hysteresis control only for an upshift in which the engine R.P.M. drops, therefore, the behaviors of the vehicle in an upshift and in lockup engagement are identical in terms of a drop in the engine R.P.M. In the case of the lockup engagement simultaneous with a shift, the vehicle R.P.M. smoothly advances at the downshift, as expected by the driver.

DESCRIPTION OF THE PREFERRED EMBODIMENT

Figure 1:
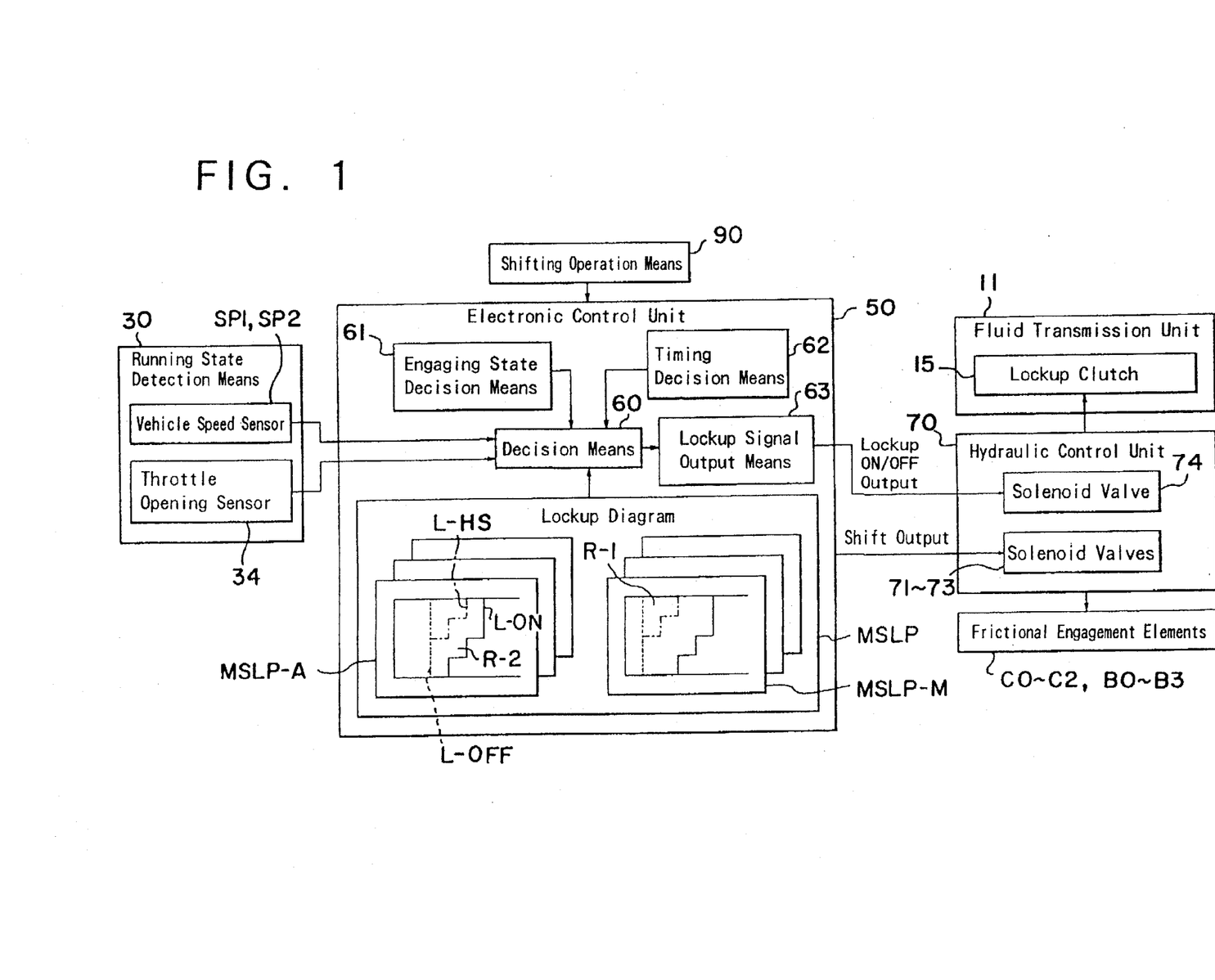
FIG. 1 is a block diagram of one embodiment of a control system according to the present invention.

As shown in FIG. 1, an automatic transmission in accordance with one embodiment of the invention includes a torque converter 11, acting as a hydraulic power transmission, and a lockup clutch 15 arranged in the torque converter 11. Running state detection means 30, for detecting the running state of the vehicle, includes vehicle speed sensors SP1 and SP2 for detecting the vehicle speed and a throttle opening sensor 34 for detecting the throttle opening. Electronic control unit 50 decides a shift in response to an output signal from the running state detection means 30 and outputs a shift signal and detects ON/OFF of the lockup clutch 15 in response to an output signal from the running state detection means 30 and outputs a lockup ON/OFF signal. Hydraulic control unit 70 is responsive to the output signals from the electronic control unit 50 in selectively actuating a plurality of solenoid valves 71 to 74 to selectively apply/release a plurality of frictional engagement elements CO to C2 and BO to B3 arranged in the gear train and for applying/releasing the lockup clutch 15. Shifting operation means 90 allows for arbitrary selection between an automatic shift mode and a manual shift mode.

Figure 2:
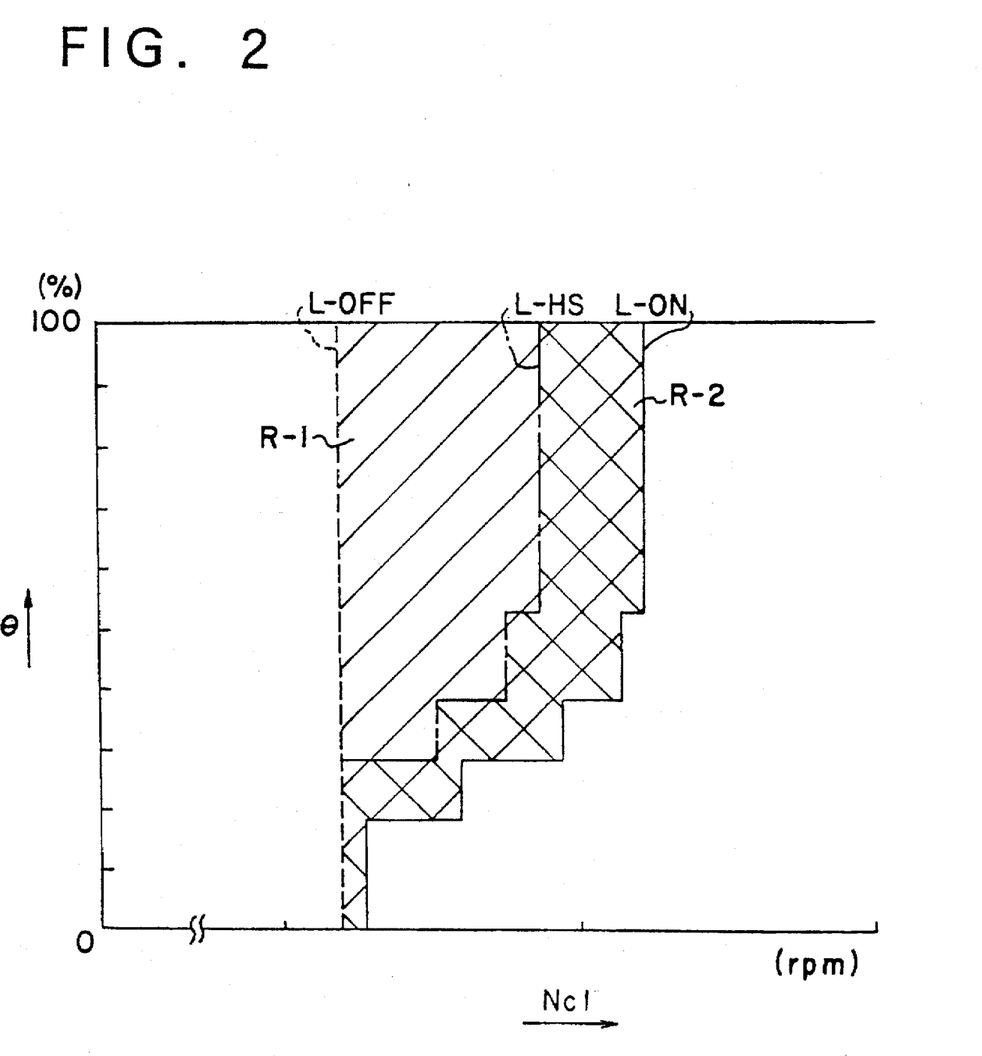
FIG. 2 illustrates a 1→2 shift on one of the lockup diagrams of the embodiment of FIG. 1.

The electronic control unit 50 has, among its stored map data, a lockup diagram (MSLP), as exemplified by the detail for the 1→2 shift in FIG. 2. In the lockup diagram (MSLP) of this example, the running state is set in accordance with a relationship between vehicle speed (Ncl) detected by the vehicle speed sensors (SP1 and SP2) and throttle opening θ detected by the throttle opening sensor 34. The lockup diagram has a first hysteresis region (as indicated by rightward rising hatches R-1) defined by a lockup OFF line (as indicated by a dotted line L-OFF) and a first lockup ON line (as indicated by a solid line L-ON); and a second hysteresis region (as indicated by rightward falling hatches R-1) defined by a second lockup ON line (as indicated by a dotted line L-HS) and the first lockup ON line (L-ON).

As shown in FIG. 1, the electronic control unit 50 includes decision means 60, engaging state decision means 61, timing decision means 62 and lockup signal output means 63. The decision means 60 generally applies the output signals from the running state detection means 30 to the lockup diagram (MSLP) and decides OFF for the lockup clutch 15 if the running state is in a region below the lockup OFF line (L-OFF), and ON for the lockup clutch 15 if the running state is above the first lockup ON line (L-ON). When a shift is made on the basis of its decision, the decision means decides ON for the lockup clutch 15 in the first hysteresis region (R-1) or the second hysteresis region (R-2) in accordance with the decisions of the engaging state decision means 61 and the timing decision means 62, in addition to the running state detected at that time.

The engaging state decision means 61 decides whether or not the lockup clutch 15 is applied at the gear stage before a shift. On the other hand, the timing decision means 62 decides whether or not a shift has been just ended. The lockup signal output means 63 outputs a signal to the solenoid valve 74 in accordance with the decision result of the decision means 60 so that the lockup clutch 15 is applied or released.

The lockup diagram (MSLP) is composed of an automatic shift mode lockup diagram (MSLP-A) which is used when the automatic shift mode is selected, and a manual shift mode lockup diagram (MSLP-M) which is used when the manual shift mode is selected. MSLP-M has its first hysteresis region (R-1) extended to a lower speed, as compared with the automatic shift mode lockup diagram (MSLP-A). The lockup diagram (MSLP) includes a number of MSLP-A and MSLP-M diagrams corresponding to the different gear stages.

Thus, throughout the automatic shift mode and the manual shift mode, if it is decided by the engaging state decision means 61 that there was no lockup engagement at the gear stage before the shift and it is decided by the timing decision means 62 that the shift has been just ended, the decision means 60 decides ON for the lockup clutch 15, if the running state at the shifting time is in the second hysteresis region (R-2). If it is decided by the engaging state decision means 61 that there was lockup engagement at the gear stage before the shift, the decision means 60 decides ON for the lockup clutch 15 if the running state at the time of the shift is in the first hysteresis region (R-1).

Especially in the manual shift mode, the decision means 60 decides whether or not the shift made on the basis of its decision is an upshift, and decides, if an upshift, ON for the lockup clutch 15 in the first or second hysteresis region, in accordance with the presence or absence of the lockup engagement at the gear stage before the shift.

Figure 3:
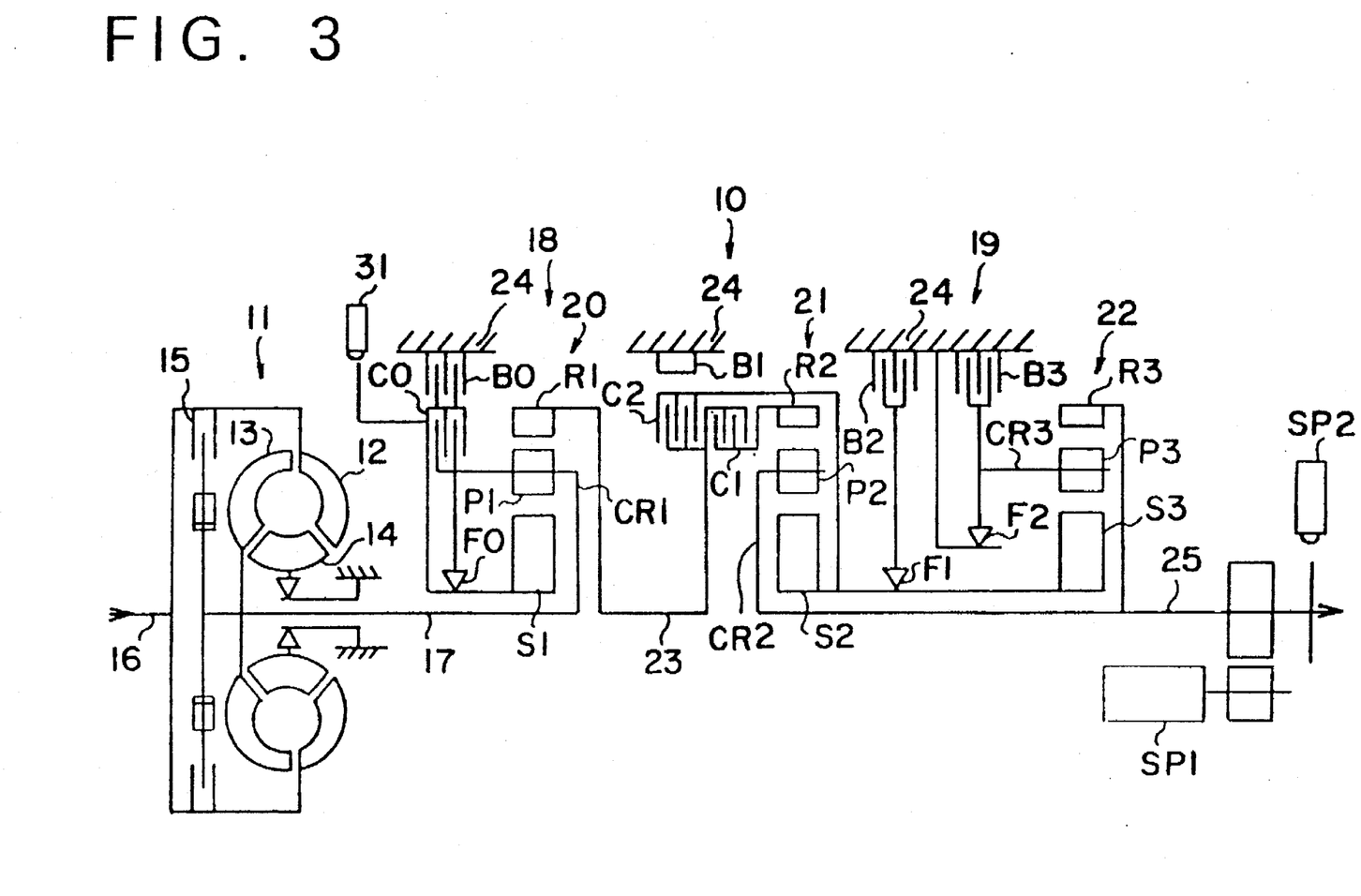
FIG. 3 is a skeleton diagram of a gear train which may be controlled in accordance with the present invention.

As shown in FIG. 3, the gear train of the automatic transmission includes a torque converter 11 having a pump impeller 12, a turbine runner 13 and a stator 14 together with the lockup clutch 15; an overdrive unit 18; and a main transmission unit 19. The overdrive unit 18 is composed of: a carrier CR 1 connected to an input shaft 17 and supporting a planetary pinion P1; a sun gear S1; and a ring gear R1 connected to the input shaft 23 of the main transmission unit 19. The overdrive direct clutch CO and a one-way clutch FO are interposed between the carrier CR 1 and the sun gear S1, and the overdrive brake BO is interposed between the sun gear S1 and a transmission case 24.

The main transmission unit 19 is composed of: a carrier CR2 connected to an output shaft 25 and supporting a planetary pinion P2; a sun gear S2 united with a sun gear S3; and a ring gear R2 connected to the input shaft 23 through the forward clutch C1. The direct clutch C2 is interposed between the input shaft 23 and the sun gear S2. A second coast brake B1, i.e. a band brake, is interposed between the sun gear S2 and the case 24. A multi-disc second brake B2 is arranged through a one-way clutch F1 between the sun gear S2 and the case 24. Main transmission unit 19 further includes a carrier CR3 supporting a planetary pinion P3, and a ring gear R3 connected to the carrier CR2 and the output shaft 25. A first/reverse brake B3 and a one-way clutch F2 are arranged in parallel between the carrier CR3 and the case 24. Incidentally, reference numeral 31 appearing in FIG. 3 designates an input R.P.M. sensor; and reference letters SP1 and SP2 designate the vehicle speed sensors.

Figure 4:
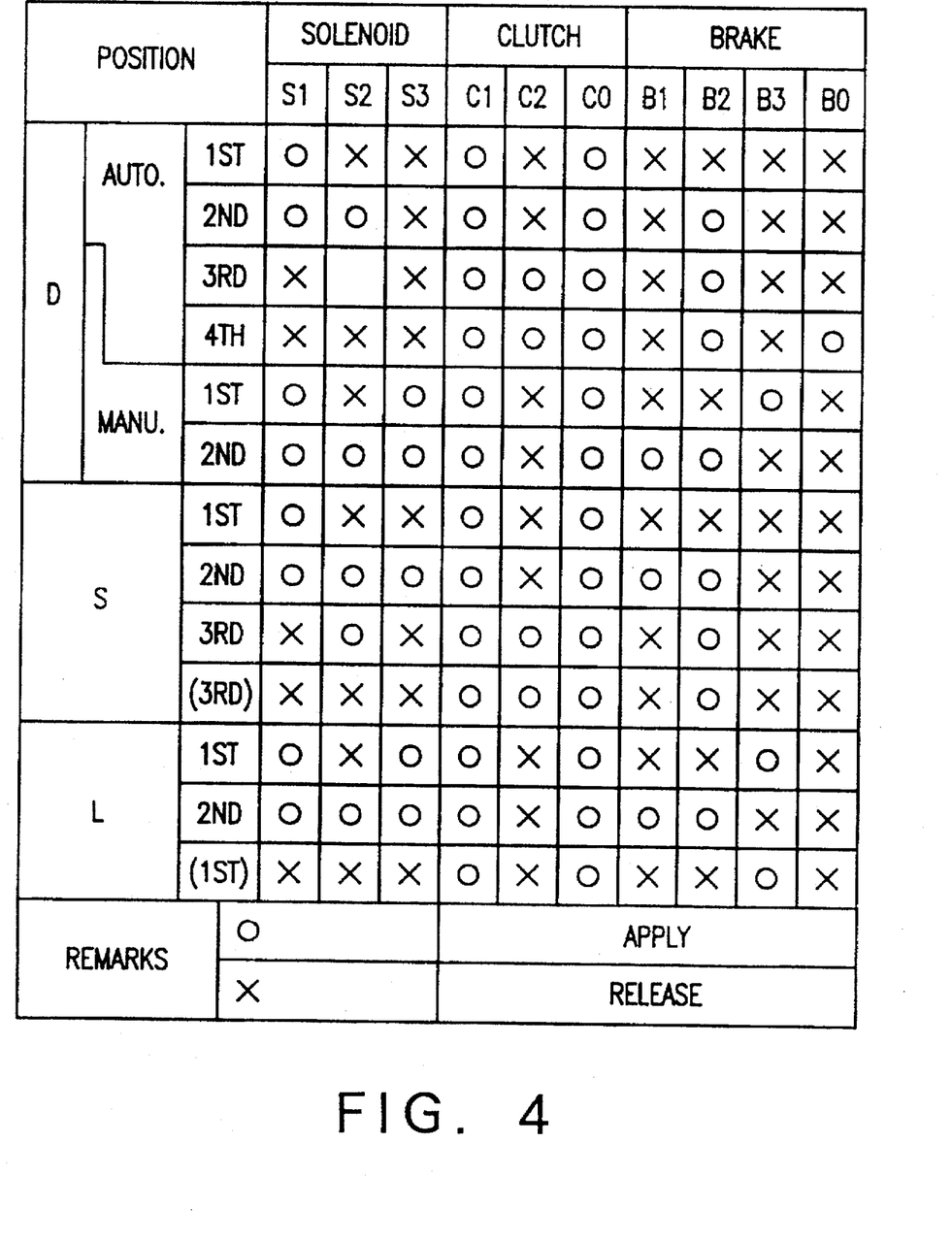
FIG. 4 is a table of the operations of the embodiment of FIG. 1.

FIG. 4 shows the ON (as indicated by symbol o)/OFF (as indicated by symbol X) states of the solenoids S1 to S3 of the aforementioned individual solenoid valves 71 to 73 correlated with engaged (as indicated by symbol o)/released (as indicated by symbol X) states of the individual clutches CO to C2 and brakes BO to B3 of the gear train, at the various positions of the manual valve (not shown) of the hydraulic control unit 70.

When the manual valve is in the D-position, at the first (1st) speed, clutch applying pressure is fed to the servos of the clutch CO and the clutch C1 if the solenoid S1 is ON. At this time, in the gear train shown in FIG. 3, the overdrive direct clutch CO and the forward clutch C1 are applied so that the rotation is input to the ring gear R2 with the overdrive unit 18 being directly connected. This rotation is transmitted on the one hand through the carrier CR2 to the output shaft 25 and on the other hand through the two sun gears S2 and S3 and the planetary pinion P3 to the carrier CR3, to reverse the carrier CR3. However, this reverse rotation is blocked by the action of the one-way clutch F2 so that the rotation of the ring gear R3 corresponding to the revolution of the planetary pinion P3 is transmitted to the output shaft 25. This torque transfer is provided in the 1st speed gear stage (1ST) of the automatic (AUTO.) shift mode.

When the solenoid S2 is turned ON, a shift to the second (2ND) speed gear stage is effected. When apply pressure is fed to the servo of the brake B2, the previously disengaged second brake B2 becomes applied so that the reaction rotation of the two sun gears S2 and S3 is blocked by the one-way clutch F1. As a result, the rotation resulting from the revolution of the planetary pinion P2 is output through the carrier CR2 to the output shaft 25.

The shift to the third speed gear stage (3RD) is effected by turning OFF the solenoid S1. In the gear train, the clutch C2 is then applied to connect the ring gear R2 and the two sun gears S2 and S3 directly and the planetary pinion P2 directly so that the two input shafts 17 and 23 and the output shaft 25 rotate in unison.

The shift to the fourth speed gear stage (4TH) is effected by turning OFF the solenoid S2. Then, the clutch CO is released, but the brake BO is applied. Since the sun gear S1 is fixed at this time, the input of the carrier CR1 is accelerated to the speed of the pinion gear P1 and this accelerated rotation is transmitted to the ring gear R1 and output to the input shaft 25.

On the other hand, the overdrive direct clutch CO is applied and the overdrive brake BO is released in a downshift from the 4th speed gear stage to the 3rd speed gear stage; the overdrive direct clutch C2 is released in a downshift from the 3rd speed gear stage to the 2nd speed gear stage; and the second brake B2 is released in a downshift from the 2nd speed gear stage to the 1st speed gear stage.

At the first speed (1ST) gear stage and the second speed (2ND) gear stage in the manual (MANU.) shift mode, on the other hand, the solenoid S3 is always ON, unlike the automatic (AUTO.) shift mode, as shown in FIG. 4. As a result, at the 2nd speed gear stage, not only the forward clutch C1, the overdrive direct clutch CO and the second brake B2, but also the second coast brake B1, are applied so that engine braking can be effected with the two sun gears S2 and S3 locked. At the 1st speed gear stage, too, not only the forward clutch C1 and the overdrive direct clutch CO, but also the first/reverse brake B3, are applied to lock the carrier CR3 to effect engine braking. Incidentally, at the 3rd speed gear stage and at the 4th speed gear stage in the manual shift mode, the states of the solenoids and of the individual clutches and brakes are the same as in the automatic shift mode.

Figure 5:
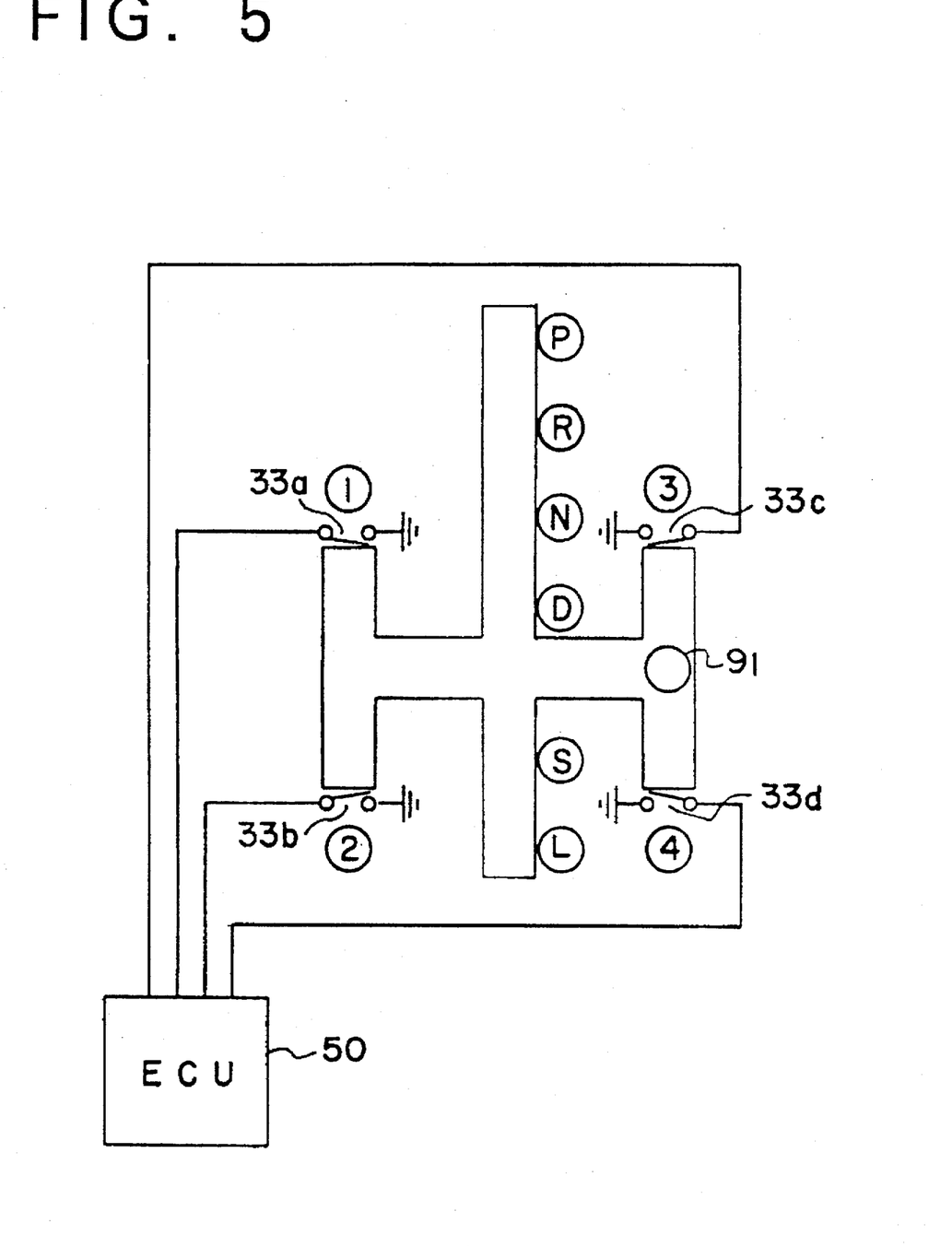
FIG. 5 is a shift pattern diagram showing the shifting operation means and position sensors.

The construction of the shift operation means 90 is conventional. Generally speaking, a shift lever 91, as shown in FIG. 5, is connected to the aforementioned manual valve of the automatic transmission through a link mechanism allowing it to be rocked back and forth and tilted to the right and to the left with respect to its support fixed to the car body. In the link mechanism, moreover, there is mounted a removable connecting mechanism for connecting/disconnecting the link mechanism with the shift lever 91. This removable connecting mechanism disconnects the shift lever 91 from the link mechanism by tilting the shift lever 91 to the right or left at the point of juncture between the I-shaped pattern for the automatic shift and the H-shaped pattern for the manual shift. Accordingly, when the automatic shift mode is selected, the shift lever 91 motion is mechanically transmitted to the manual valve which transforms that motion into signals input to the electronic control unit 50 through a shift position sensor or sensors exemplified by the neutral start switch.

When the manual shift mode is selected, on the other hand, the movement of the shift lever 91 is detected and input to the electronic control unit 50 by four position sensors 33a to 33d, which are limit switches or the like and are positioned at the terminal positions of the manual shift H-shaped pattern to detect the arrival of the shift lever 91 at one of these terminal positions. The inputs from these sensors 33 are detected by the electronic control unit 50 as a 1st speed signal at the left-hand front, a 2nd speed signal at the left-hand rear, a 3rd speed signal at the right-hand front and a 4th speed signal at the right-hand rear, according to the shift pattern of the manual transmission. In response to these ON signals, the individual gear stages are selected.

Figure 6:
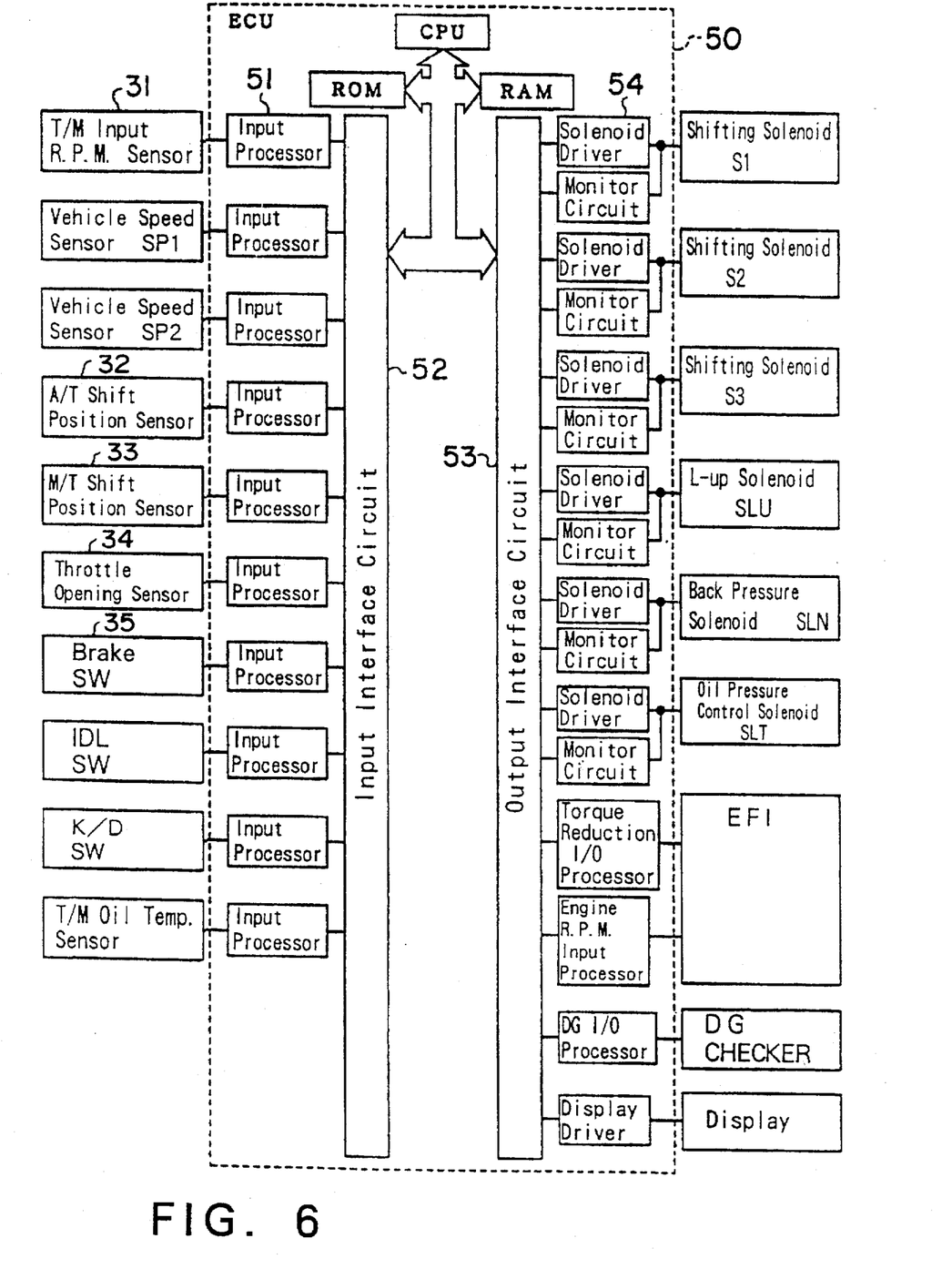
FIG. 6 is a block diagram of an electronic control unit used in the embodiment of FIG. 1.

FIG. 6 depicts the overall construction of the electronic control unit 50 (ECU) which controls the entire automatic transmission. The sensor signals, as received from the various input detectors, are introduced through input processors 51 to an input interface circuit 52 and are stored and processed by a central processing unit (CPU), a read only memory (ROM) and a random access memory (RAM). After this, the processed signals are output as control signals through an output interface circuit 53 to drive/control the shifting solenoids S1 to S3, and so on, through the various drivers and processors 54.

The input detectors include: a transmission (T/M) input R.P.M. sensor 31 arranged in the transmission for detecting the transmission input rotation from the rotation of the sun gear S1; vehicle speed sensors (SP1 and SP2) for detecting the output rotation of the transmission; an automatic transmission (A/T) shift position sensor 32 for detecting which position of the I-pattern of the automatic shift is selected; the manual transmission (M/T) shift position sensor 33, arranged on the shifting operation sensor 90, for detecting which position of the manual shift pattern is selected; a throttle opening sensor 34 arranged in the engine for detecting the degree of opening of the throttle by a potentiometer; a brake switch (SW) 35 arranged on the brake pedal unit for detecting a braking operation; an idle switch (IDL SW) arranged in the throttle opening sensor for detecting that the accelerator is fully closed; a kickdown switch (K/D SW) arranged in the throttle pedal unit or the throttle opening sensor unit for detecting that the accelerator is fully opened to require a kickdown; and a transmission (T/M) oil temperature sensor mounted in the transmission for detecting the transmission oil temperature.

Solenoid drivers 54 are provided at the output side for generating predetermined voltages or currents to drive the solenoids (S1 to S3) of the solenoid valves which, in turn, switch the oil pressures to actuate the individual shift valves in the hydraulic control unit in accordance with the selected gear stage and to drive the solenoids (SLU, SLN and SLT) of the linear solenoid valves for controlling lockup, the back pressures and the line pressures. Monitor circuits 55 perform self-diagnosis by checking the actions of the individual solenoids to decide if a failure has occurred. A torque reduction input/output processor 56 issues a signal to the electronic control unit (EFI) 57 to temporarily reduce the torque of the engine so as to damp the shock at the time of a shift. A processor 58 inputs the engine R.P.M. A DG input/output processor 59 for a DG checker 64 outputs the self-diagnosis signal for a detected failure of the electronic control unit (ECU) 50. Display driver 65 provides on display device 66 a display of the state of the transmission.

Figure 7:
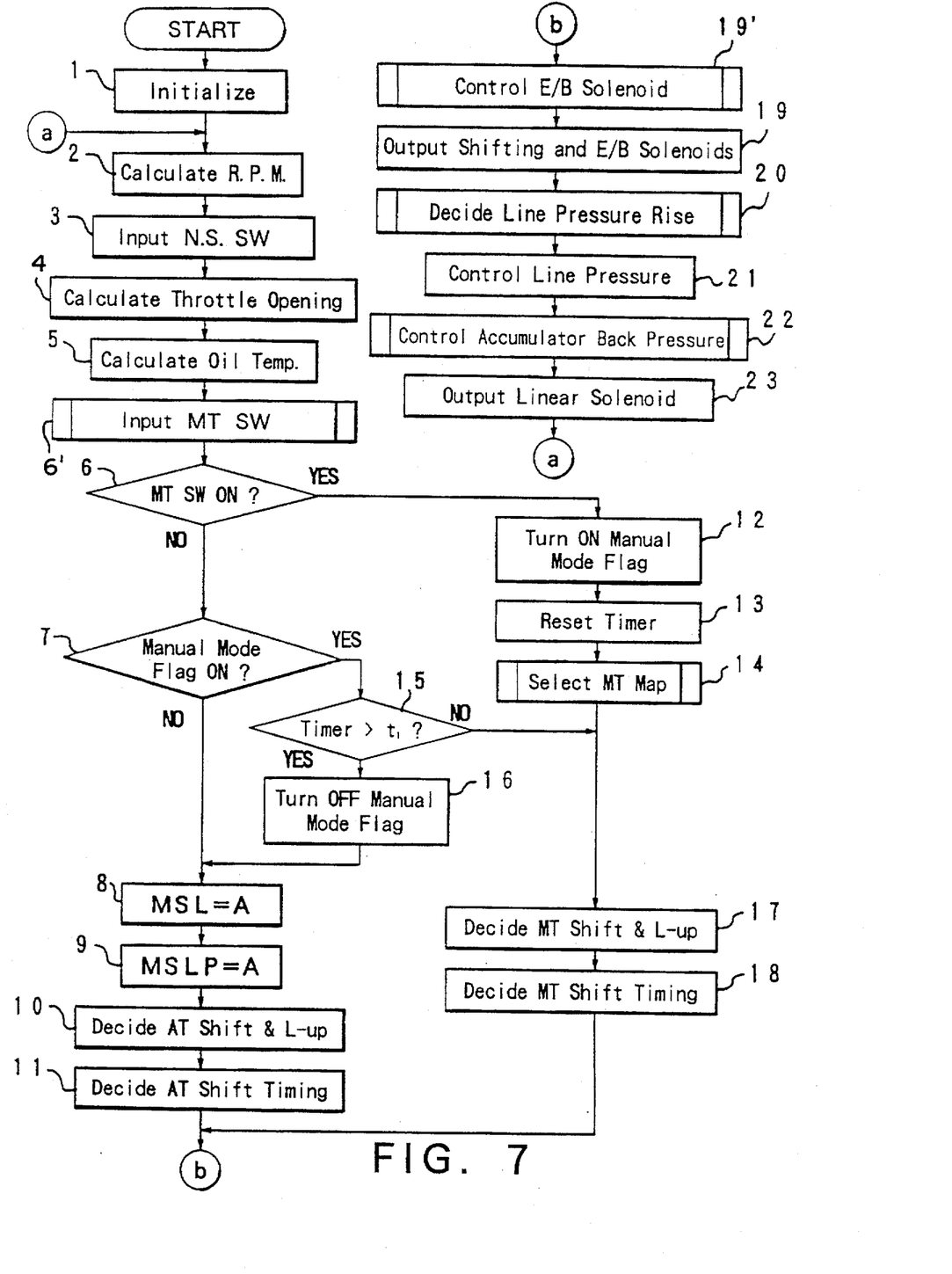
FIG. 7 is a flow chart showing a control routine utilized by the electronic control unit of FIG. 6.

The control routine utilized by electronic control unit (ECU) is shown in FIG. 7. In Step 1 all conditions are initialized for starting the program. At Step 2, the present R.P.M. of the input shaft and that the transmission are of the transmission are calculated from the signals of the T/M input rotation sensor 31 and the vehicle speed sensors (SP1 and SP2). At Step 3, the present shift lever position, as selected in the I-pattern, is detected from the signal of the A/T shift position sensor (or neutral start switch N.S. SW). Simultaneously with this, the neutral start switch is checked for failure. At Step 4, the present throttle opening is calculated from the signal of the throttle opening sensor 34. At Step 5, the present transmission oil temperature (or ATF temperature) is calculated from the signal of the T/M oil temperature sensor.

At Step 6', the shift lever position is decided from the signal of the M/T shift position sensors 33a–33d. At Step 6, it is decided which MT shift position flag, corresponding to the selected position at the preceding Step 6', is ON. At Step 7, it is decided whether or not the MT mode flag is ON (or whether or not the MT mode has been selected). At Step 8, AT shifting data A are read in shift diagram data MSL. At Step 9, the automatic transmission (AT) L-up data A are read in lockup (L-up) diagram data MSLP. At Step 10, the shift and the lockup (L-up) are decided on the basis of the data read at Steps 8 and 9 and the various conditions calculated beforehand. At Step 11, the timing of the shift and the lockup (L-up), is decided.

At Step 12 a manual transmission (MT) mode flag is turned ON to establish the manual transmission (MT) mode selected state. At Step 13, the value of an automatic transmission (AT) mode returning timer is reset. Step 14 is a subroutine for reading the various data for the manual transmission (MT) mode. At Step 15, the value for the automatic transmission (AT) mode returning timer is compared with a set value t1. This step prevents the manual transmission (MT) mode from being released during a manual shifting operation involving passage through a neutral point. At Step 16, the manual transmission (MT) mode flag is turned OFF to restore the automatic transmission (AT) mode, if the condition of Step 15 holds. At Step 17, the shift and the lockup (L-up) are decided on the basis of the data, as read in the manual transmission (MT) map selecting subroutine, and the various conditions calculated beforehand. At Step 18, the timing of the shift and the lockup (L-up) is decided. At Step 19', the engine brake solenoid S3 is controlled and, from the manual shift position, the gear stage to be output is decided and so on. At Step 19, the signals are outputted to the individual solenoids (S1 to S3) to start the shift in accordance with the decisions of Steps 10 and 11 or Steps 17, 18 and 19'. Step 20 is a subroutine for deciding a temporary line pressure rise so as to shorten the time lag at the manual transmission (MT) mode. At Step 21, the line pressure is controlled according to the throttle opening and is boosted according to the decision of Step 20. Step 22 is a subroutine for controlling the accumulator back pressure, which differs between the automatic transmission (AT) mode and the manual transmission (MT) mode, so as to prevent shock in a shift. At Step 23, the individual linear solenoids (SLU, SLT and SLN) are controlled by outputs in accordance with the decisions and controls of Steps 10 and 11 or 17, 18, 21 and 22.

Figure 8:
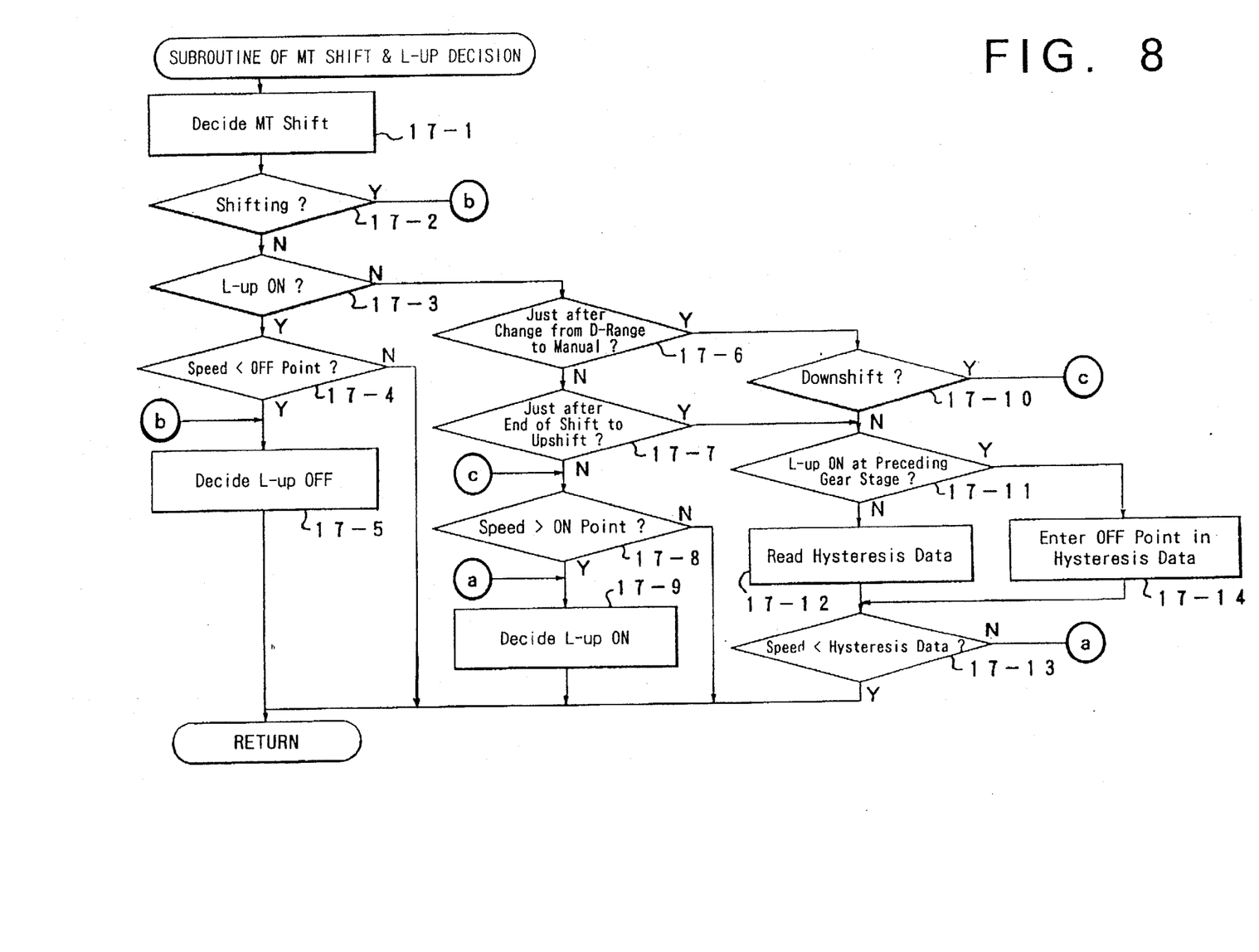
FIG. 8 is a flow chart of a subroutine for deciding a manual shift and a lockup.

FIG. 8 shows the subroutine for deciding the manual transmission (MT) and the lockup (L-up) of the foregoing Step 17. At Step 17-1, the output gear stage is decided on the basis of the data read at Step 14 and the various conditions calculated beforehand. At Step 17-2, it is decided whether or not the transmission is being shifted. This is a decision for temporarily turning OFF the lockup during the transition of a shift so as to prevent shock. If this decision is YES, the subroutine skips to Step 17-5 to decide lockup OFF.

If the decision of Step 17-2 is NO, it is decided at Step 17-3 whether or not the lockup (L-up) is ON at present. If this decision is YES, the subroutine subsequently decides the timing for outputting the lockup OFF signal. At Step 17-4, it is decided whether or not the vehicle speed at present is lower than the lockup (L-up) OFF point determined by the previous reading. If this decision is YES at Step 17-4, lockup (L-up) OFF is decided at Step 17-5.

If the decision at Step 17-3 is NO, it is decided at Step 17-6 whether or not the shift is from the D-range to manual (i.e., from the auto mode to the manual mode). This is a decision for determining if lock-up shock is allowed in the specific case wherein the driver is prepared for a shift shock, although no actual shift occurs, due to selection of a specific manual gear stage by operation of the shift lever while the vehicle is running at that gear stage in D-range. Thus, if this decision is YES, the subroutine transfers to steps for deciding the lockup.

At Step 17-7, it is decided whether or not an upshift has just ended. If both the answers of Steps 17-6 and 17-7 are NO, the lockup in the hysteresis region is not allowed. Hence, it is decided at Step 17-8 whether or not the present speed exceeds the lockup (L-up) ON point read beforehand. If the decision of Step 17-8 holds, lockup (L-up) ON is decided at Step 17-9. This is the case in which the lockup occurs at the highest vehicle speed.

If both the answers of Steps 17-6 and 17-7 are YES, an earlier (or at a lower vehicle speed) lockup can be performed in the hysteresis region, as timed with the shift. In the present embodiment, however, the lockup (L-up) control is not performed at a downshift so as to avoid engine stalling. At the change from the D-range to the manual mode, therefore, it is decided at Step 17-10 whether or not the shift is a downshift. If this answer is YES, the subroutine returns to Step 17-8. It is decided at Step 17-11 whether or not the lockup (L-up) was ON at the previous gear stage. If this answer is NO, the present hysteresis data are read out at Step 17-12 from the data map. It is then decided at Step 17-13 whether or not present speed is lower than the previously read hysteresis data. If this answer is NO, the subroutine returns to Step 17-9 for deciding lockup ON. On the other hand, if the decision of Step 17-11 reveals lockup (L-up) ON at the previous gear stage, this means that there is no fluid slip is in the torque converter. Even if the next gear stage quickly transfers to lockup ON, a shift corresponding to a step between the two gear stages at the gear train side is effected without shock due to the lockup ON. In this case, the lockup (L-up) OFF point is entered into the hysteresis data at Step 17-14, and it is likewise decided at Step 17-13 whether or not the present speed is below the previously read hysteresis data. If this answer is NO, the subroutine returns to make the lockup ON decision of Step 17-9. If below the hysteresis data, the subroutine returns as is.

Figure 9:
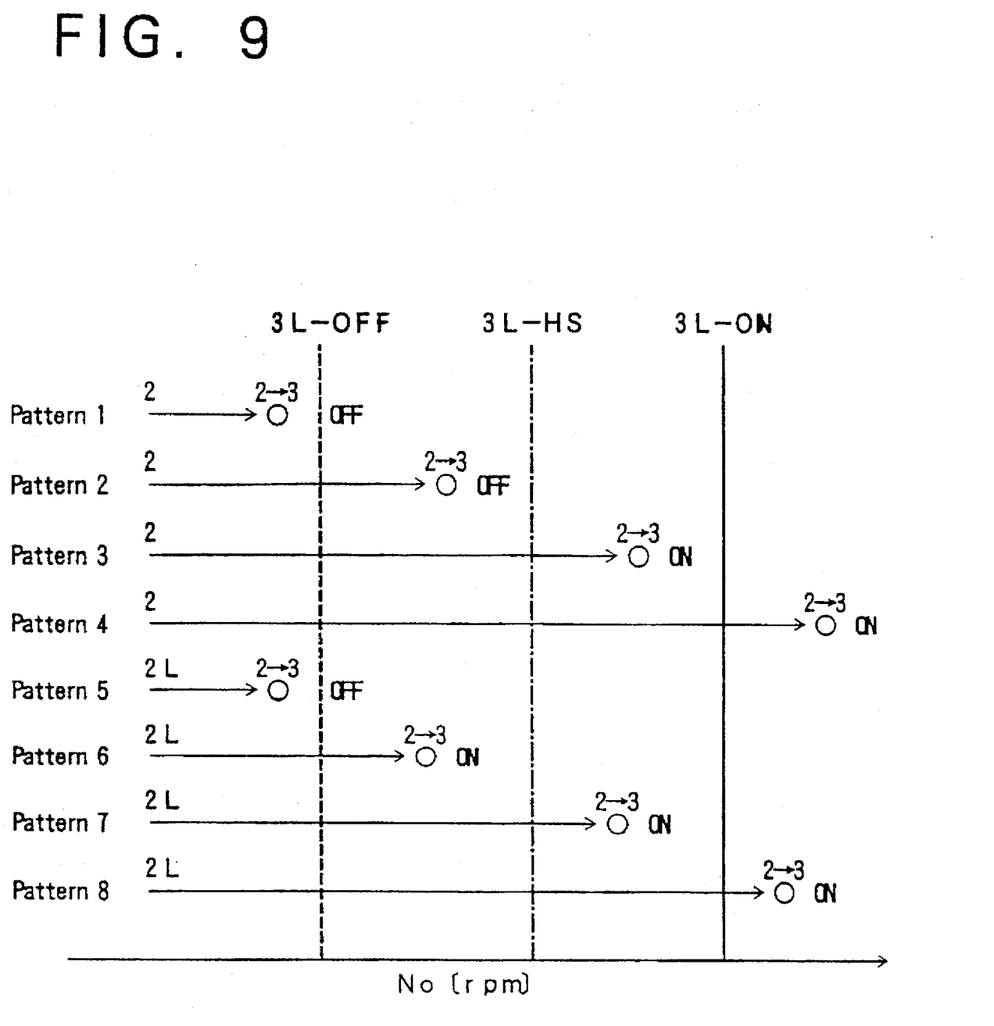
FIG. 9 is a sequence diagram of a typical example of lockup ON/OFF control by the routine of FIG. 7.

Next, the sequence of the steps involved in the lockup decision in the embodiment will be described by using a 2→3 shift as a representative example with reference to FIG. 9. In the case of this diagram, the abscissa indicates the R.P.M. (No) of the output shaft 25 (as shown in FIG. 3), used in place of the vehicle speed (v), and the starting points of the arrows are determined by the shifting conditions, whereas symbols o indicate the instants of shift outputs. In pattern 1, the R.P.M. rises from the 2nd-speed lockup OFF state, and the 2→3 shift output is issued in a region lower than the 3rd-speed lockup OFF line (3L-OFF) so that the lockup output is turned OFF. Likewise, according to pattern 2, the R.P.M. rises from the 2nd-speed lockup OFF state to exceed the 3rd-speed lockup OFF line (3L-OFF), but the 2→3 shift output is issued in a region lower than the 3rd-speed hysteresis line (3L-HS) so that the lockup output is turned OFF.

Figure 10:
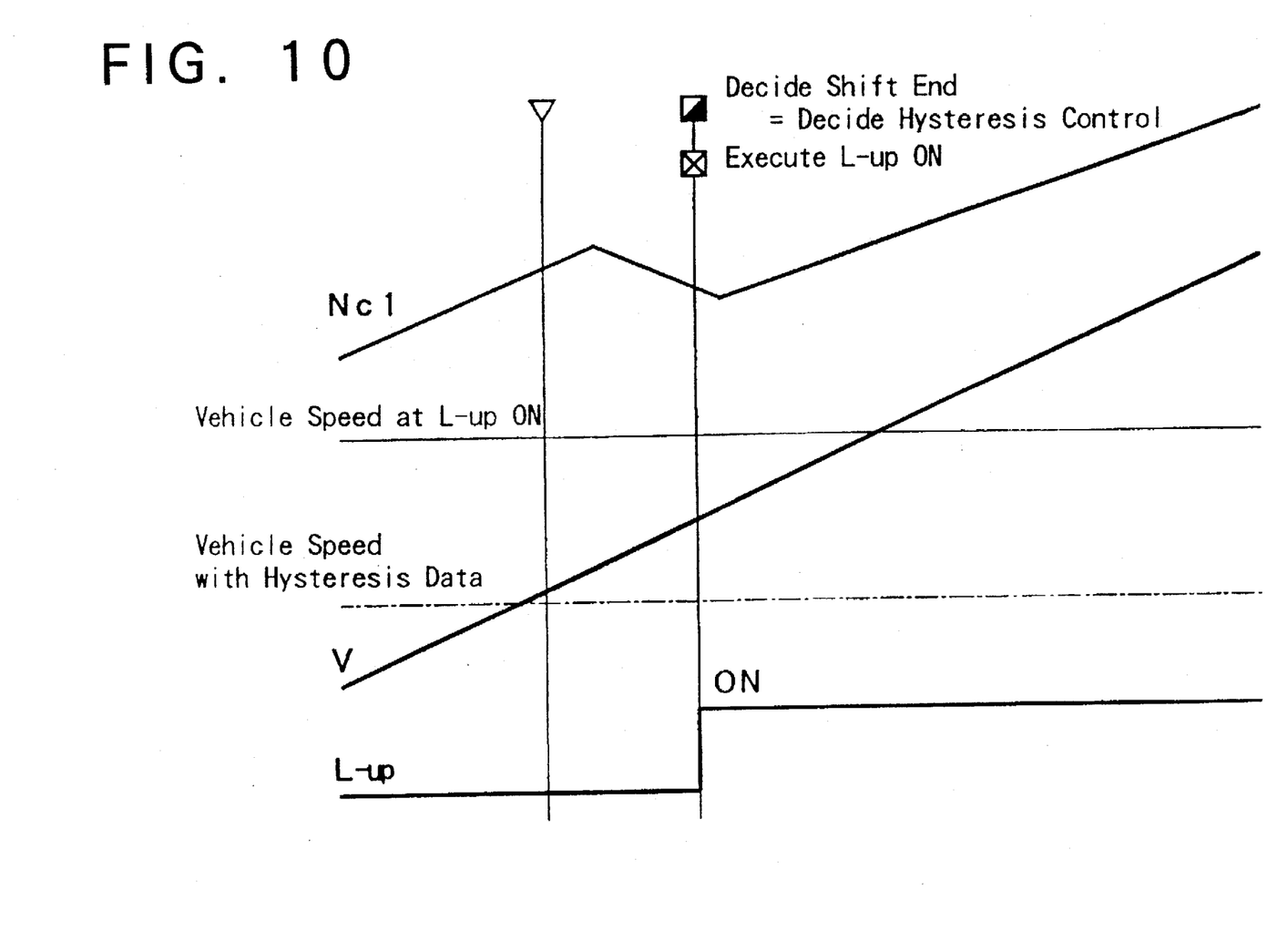
FIG. 10 is a time chart showing one example of time periods for a shift and lockup by the control routine, in terms of changes in lockup output, vehicle speed and input R.P.M.

In pattern 3, the R.P.M. rises from the 2nd-speed lockup OFF state and does not cross the 3rd-speed lockup ON line (3L-ON) but, rather, stops within the 3rd-speed second hysteresis region, between the 3rd-speed hysteresis line (3L-HS) and the 3rd speed lockup ON line (3L-ON), so that the lockup output is turned ON simultaneously with the 2→3 shift output. A lockup time chart according to those lockup ON outputs is illustrated in FIG. 10. In FIG. 10, symbol ▽ indicates the instant of shift output, where the lockup is OFF and the vehicle speed v is in the ON/OFF hysteresis region. The input R.P.M. Ncl temporarily drops, when the actual shifting operation is started and rises again upon end of lockup. According to the next pattern 4, the R.P.M. rises from the 2nd-speed lockup OFF state, and the 2→3 shift output is issued in the region over the 3rd-speed lockup ON line (3L-ON), so that the lockup output is turned ON.

According to pattern 5, unlike the preceding four patterns, the R.P.M. rises from the 2nd-speed lockup ON state, but the 2→3 shift output is issued in the region lower than the 3rd-speed lockup OFF line (3L-OFF), so that the lockup output is turned OFF. In pattern 6, the R.P.M. also rises from the 2nd-speed lockup ON state, but the 2→3 shift output is issued in the first hysteresis region, over the 3rd-speed lockup OFF line (3L-OFF), so that the lockup output is turned ON simultaneously with the 2→3 shift output. According to pattern 7, also, the R.P.M. rises from the 2nd-speed lockup ON state, does not cross the 3rd-speed lockup ON line (3L-ON), and the 2→3 shift output is issued in the 3rd-speed second hysteresis region, so that the lockup output is turned ON simultaneously with the 2→3 shift output. According to pattern 8, moreover, the R.P.M. rises from the 2nd-speed lockup ON state, and the 2→3 shift output is issued in the region over the 3rd-speed lockup ON line (3L-ON), so that the lockup output is turned ON.

In the automatic transmission as described above, when a shift is decided while the running state is in the second hysteresis region (R-2), formed within the first hysteresis region (R-1), lock-up ON is decided regardless of whether or not the lockup clutch 15 in the released state. As a result, the lockup engagement is effected simultaneously with the shift in the second hysteresis region (R-2), set to a lower speed side than the ordinary lockup region. Thus, the lockup region is extended to the lower speed side while preventing an engaging shock unexpected by the driver. Moreover, since the second hysteresis region (R-2) is defined by the second lockup ON line (L-HS) at the higher speed side relative to the lockup OFF line (L-OFF), no lockup is effected in the lower speed region in the vicinity of the lockup OFF line (L-OFF) where the change of the engine R.P.M. due to lockup engagement would be relatively high. Application of the lockup clutch 15 is prevented in this lower speed region by setting the lockup OFF line (L-OFF), as is conventional in the prior art, to prevent premature release.

In the present invention, moreover, since the slip of the torque converter 11 is zero, if the lockup is in effect at the gear stage before the shift, the slip of the torque converter 11 is extremely slight in the case of lockup engagement simultaneously with the shift after lockup release in preparation for the shift. In the low speed region near the OFF line (L-OFF), the engine R.P.M. is not changed so much by the lockup engagement as to cause a shock exceeding that considered allowable. If lockup engagement at the gear stage before the shift is decided by the engaging state decision means 61, lockup is decided even in the first hysteresis region (R-1), so that the lockup region can be further extended to the lower speed side while suppressing engaging shock to within the allowable range.

On the other hand, if a shift and lockup were to be simultaneously effected in the lockup region extended to the lower speed side, seriously high shock would occur, if the lockup engaging timing is premature relative to the shift, and could double if excessively delayed. Therefore, in the present invention, the timing decision means 62 monitors the shifting situation so that the lockup clutch 15 is applied as the shift end is decided. As a result, the lockup shock occurs just after the end of the shifting shock, as a continuation of same, so that a double magnitude shock can be prevented and the actual shock suppressed to within the allowable range.

In order to achieve a feeling of a manual shift operation, it is desirable, from the viewpoint of increasing the direct feeling of a manual shift, to extend the lockup region to a lower speed than that for the automatic shift. When the manual shift mode is selected, according to this invention, lockup control and the hysteresis control for the lockup clutch 15 are effected by using the lockup diagram (MSLP-M) which is intrinsic to the manual shift mode and which is extended to the lower speed side. Thanks to the hysteresis control of the lockup clutch 15, moreover, clutch 15 can be applied over a very wide range so that a direct feeling, like that of a manual transmission, can be provided without unexpected shock.

Moreover, when the lockup region is extended to the lower speed side by the aforementioned lockup control, if lockup output were in effect at the time of an abrupt downshift for engine braking, the engine might be stall due to an overload; however, in the present invention, this possibility of engine stalling is eliminated by the decision means 60 which decides the type of shift and effects the aforementioned lockup control only for an upshift. Since the engine R.P.M. drops at the instant of lockup engagement, the driver might become alarmed by the unexpected behavior of the vehicle, if he executes a downshift, expecting a rise in the engine R.P.M. and, instead, does not feel the expected rise in R.P.M. due to lockup engagement. The present invention, by utilizing the aforementioned hysteresis control only for an upshift in which the engine R.P.M. drops, provides a response consistent with that expected by the driver, because the drop due to the upshift and that due to lockup engagement are identical.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control system for an automatic transmission mounted in a vehicle and having a fluid transmission unit and a lockup clutch arranged in the fluid transmission unit, the control system comprising:

running state detection means for detecting the running state of a vehicle and for outputting running state signals;

an electronic control unit for making a shift decision and outputting a shift signal, responsive to the running state signals, and for deciding ON/OFF for the lock-up clutch and outputting a lockup ON/OFF signal responsive to the running state signals;

a hydraulic control unit for selectively actuating a plurality of solenoid valves, responsive to the shift signal and to the lockup ON/OFF signal, to selectively engage/release a plurality of frictional engagement elements and to thereby establish a selected gear stage and to engage/release the lockup clutch;

wherein said electronic control unit comprises:

a lockup diagram having a first hysteresis region defined by a lockup OFF line and a first lockup ON line, and a second hysteresis region defined by a second lockup ON line, formed in said first hysteresis region, and said first lockup ON line;

lockup decision means for deciding OFF for the lockup clutch when the detected running state is below said lockup OFF line, for deciding ON for the lockup clutch when the detected running state is over said first lockup ON line, for deciding ON for the lockup clutch when a shift is effected on the basis of said shift decision and when the detected running state is in said second hysteresis region, said lockup decision means making a lockup decision of ON or OFF by comparing said running state signals against said lockup diagram and basing said lockup decision on said comparison; and lockup signal output means for outputting a signal to a predetermined one of said plurality of solenoid valves to engage/release said lockup clutch responsive to said lockup decision reached by said lockup decision means.

2. An automatic transmission according to claim 1, wherein said electronic control unit further includes engaging state decision means for deciding whether or not said lockup clutch is applied at the present gear stage in effect at the time of said output of said shift signal, and wherein said lockup decision means decides ON for said lockup clutch when the detected running state at the time of output of said shift signal is in said second hysteresis region if it is decided by said engaging state decision means that said lockup clutch is not engaged at said present gear stage, and decides ON for said lockup clutch when the running state at the time of output of said shift signal is in said first hysteresis region if it is decided by said engaging state decision means that said lockup clutch is engaged at said present gear stage.

3. An automatic transmission according to claim 2, wherein said electronic control unit further includes timing decision means for deciding whether or not the shift initiated responsive to said shift signal has just ended, and wherein said lockup decision means decides ON for said lockup clutch in said first or second hysteresis region on the basis of the decision of said engaging state decision means if it is decided by said timing decision means that said shift has just ended.

4. An automatic transmission according to claim 2, further comprising:

shifting operation means for selecting either an automatic shift mode or a manual shift mode;

wherein said lockup diagram includes: an automatic shift mode lockup diagram for deciding ON/OFF for said lockup clutch in said automatic shift mode and a manual shift mode lockup diagram for deciding ON/OFF for said lockup clutch in said manual shift mode, both of said automatic shift mode diagram and said manual shift mode lock-up diagram having said first and second hysteresis regions, the first hysteresis region of said manual shift mode lockup diagram being extended to a lower speed than the first hysteresis region of said automatic shift mode lockup diagram, and wherein said lockup decision means decides ON for said lockup clutch in said first or second hysteresis region on the basis the decision of said engaging state decision means when said manual shift mode is selected.

5. An automatic transmission according to claim 2, wherein said lockup decision means decides whether or not the shift decided by said electronic control unit is an upshift, and decides, if said decided shift is an upshift, ON for said lockup clutch in said first or second hysteresis region on the basis of the decision of said engaging state decision means.

* * * * *

UNITED STATES PATENT AND TRADEMARK OFFICE
CERTIFICATE OF CORRECTION

PATENT NO.   : 5,683,327
DATED        : November 4, 1997
INVENTOR(S)  : INUZUKA et al It is certified that error appears in the above-indentified patent and that said Letters Patent is hereby corrected as shown below:

Col. 9, line 12, after "that" insert --of the output shaft of-- and after "are" delete "of the"; and
    line 13, delete "transmission are".

Signed and Sealed this

Seventeenth Day of November, 1998

Attest:

BRUCE LEHMAN

Attesting Officer      *Commissioner of Patents and Trademarks*